(12) United States Patent
Pykälistö

(10) Patent No.: US 6,201,861 B1
(45) Date of Patent: Mar. 13, 2001

(54) METHOD FOR MAKING A CONTINUING CALL IN AN INTELLIGENT NETWORK CALL

(75) Inventor: Mika Pykälistö, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 08/860,208

(22) PCT Filed: Jan. 3, 1996

(86) PCT No.: PCT/FI96/00009

§ 371 Date: Jul. 2, 1997

§ 102(e) Date: Jul. 2, 1997

(87) PCT Pub. No.: WO96/21325

PCT Pub. Date: Jul. 11, 1996

(30) Foreign Application Priority Data

Jan. 4, 1995 (FI) .................................................. 950053

(51) Int. Cl.[7] .............................. H04M 3/42; H04M 7/00; H04M 17/00
(52) U.S. Cl. .......................... 379/207; 379/209; 379/216; 379/230; 379/357
(58) Field of Search .................................... 379/201, 207, 379/209, 216, 219, 220, 230, 242, 355, 356, 357

(56) References Cited

U.S. PATENT DOCUMENTS 5,187,740   2/1993   Swaim et al. .......................... 379/209
5,379,383 * 1/1995   Yunoki ................................ 379/242 X
5,511,113 * 4/1996   Tasaki et al. ........................ 379/230 X

OTHER PUBLICATIONS

Advanced Intelligent Network, Release 1, Network and Operation Plan, Jun. 1990.
"Distributed Functional Plane for Intelligent Network CS–1", ITU–T Recommendation Q.1214, Oct. 1995.

* cited by examiner

Primary Examiner—Harry S. Hong
(74) Attorney, Agent, or Firm—IP Group of Pillsbury Madison & Sutro LLP

(57) ABSTRACT

In a method according to one intelligent network recommendation, when B subscriber has hung up the phone, a Service Switching Point (SSP) sends a message to a Service Control Point (SCP) about the hanging up. The SCP responds with a request to disconnect the B leg. A separate request increases unnecessary signalling. In another known method, after B subscriber has hung up, a timer is started and the B leg is disconnected only after a set period of time. This waiting time is annoying to A subscriber, especially when there are many calls to be made. In the method according to the invention, A subscriber can make a continuing call without waiting or without causing unnecessary signalling so that after a Service Control Function (SCF) receives information about the break off of the call, it sends a message to a Service Switching Function (SSF) containing a request to collect the dialling by A subscriber relating to a new B subscriber. The Service Switching Function (SSF) directs the telephone network to disconnect the connection to B subscriber and create a connection to a new B subscriber.

2 Claims, 5 Drawing Sheets

METHOD FOR MAKING A CONTINUING CALL IN AN INTELLIGENT NETWORK CALL

BACKGROUND OF THE INVENTION

1. Field of the Invention

The present invention relates to continuing an intelligent network service during an ongoing call with a new call. The invention especially relates to switching off B subscriber and releasing a B line in connection with a call.

2. Description of the Related Art

The fast progress in telecommunication has made it possible for teleoperators to provide users with many different types of services. Network architecture that provides improved services is known as an Intelligent Network (IN). The intelligent network architecture can be applied to most telecommunication networks, such as, e.g. public switched telephone networks (PSTN), mobile station networks and packet switched public data networks (PSPDN) and ISDN and B-ISDN networks (Integrated Services Digital Network, Broadband-ISDN). Irrespective of network technology, the object of intelligent network architecture is to make the creation, control and management of new teleservices easier. Belcore's AIN Rel.1 (Advanced Intelligent Network, Release 1) and CCITT recommendation Capability Set 1 (CS1) are the current IN specifications.

The intelligent network comprises several different components that can be divided into logical and physical components. The physical architecture of the intelligent network is shown in FIG. 1. A Service Switching Point (SSP) gives the user access to the network and makes all the necessary selections. It is able to detect the service requests of the intelligent network. operationally, the SSP contains call management and service selection functions. A Service Control Point (SCP) comprises the service programs that are used for producing intelligent network services. A Service Data Point (SDP) is a database which contains data from the client and the network that the SCP service programs use to produce individualized services. The SCP can use the services of the SDP either directly or via a signalling network. An Intelligent Peripheral IP provides special functions, such as announcements and audio and multifrequency recognition. A Service Switching and Control Point SSCP consists of the SCP and the SSP in one node. Some of the functions of a Service Management Point SMP are database management, network control and testing and network data collection. It can be connected to all other physical entities. A Service Creation Environment Point (SCEP) is used for defining, developing and testing intelligent network services, and for supplying the services to the SMP. An Adjunct AD of the service corresponds operationally to the Service Control Point SCP but it is connected directly to the SSP. A Service Node SN can control the intelligent network services and perform data transfer with the users. It communicates directly with one or more SSPs. A Service Management Access Point SMAP is a physical entity that provides certain users with a connection to the SMP.

A useful conceptual method in handling intelligent networks is to use the model of a Distributed Functional Plane (DFP) disclosed in FIG. 2 which illustrates the intelligent network as functional wholes in accordance with CS-1.

The functions relating to call control are SSF, SRF, CCF and CCAF. A Service Switching Function SSF connects a Call Control Function CCF and a Service Control Function SCF to one another. It allows the Service Switching Function SCF to control the Call Control Function CCF. A specialized resources function SRF provides a class of resources that can be accessed through other networks. Examples of these are DTMF transmission and reception, protocol changes, voice detection etc.

The Call Control Function (CCF) refers to the establishment of a call and connection in: a conventional manner. A Call Control Agent Function (CCAF) handles the access of the user to the network. Functions relating to service control are SCF and SDF. A Service Control Function SCF contains the service logic of the intelligent network and takes care of service-related handling. A Service Data Function (SDF) is responsible for an access to the service-related data and network data and provides a logical data check. It hides from the SCF the actual realization of data and provides the SCF with a logical view of the data.

Functions SCEF, SMF and SMAF relating to management can be understood on the basis of FIG. 1, herefore they will not be explained here.

A service request of a calling party typically comprises of picking up the receiver and/or a certain number sequence. The Call Control Function (CCF) has no service data but it is programmed to identify service requests. It interrupts the establishment of a call for a moment and notifies the state of the call to the Service Switching Function (SSF). The function of the SSF is to interpret the service request and the information on the state of the call, form a standardized service request and send the request to the SCF. The SCF receives the request and decodes it. After this, it forms, encodes and sends a standardized response to the SSF. The forming of the response can involve a complicated translation of service logic, activating a Prompt and Collect Sequence or a request to different SDFs. The SSF receives, decodes and interprets the. response of the SCF. Then it gives precise instructions to the CCF for performing the preparation process. In accordance with intelligent network recommendation CS-1, the call control function CCF-always remains fully responsible for the integrity and control of the local connections.

In forming the response to the SSF, the Service Control Function SCF may have to take part in the conversation between the calling party and the party to be called. This takes place in the form of a Prompt and Collect Sequence that the SCF has authorized the SRF to perform. Typically, the SCF directs the SSF to connect the calling party or the party to be called (End-user) to a suitable physical resource by employing the SRF. The resource can be e.g. a voice announcement system. The SCF guides the SRF in the required Prompt and Collect Sequence and after that "freezes" the handling of the call temporarily. The SRF activates the Prompt and Collect Sequence and takes part in the conversation between the calling party and the party to be called. The response, which can be e.g. the personal ID number, is encoded and returned to the SCF and the audio connection is terminated. After this, the SCF continues with the service control sequence.

A Basic Call State Model BCSM defined in connection with the IN network is a state automaton description of those CCF functions that are needed for establishing and maintaining a connection between users. It describes various stages of call control and contains the points in which call control can be interrupted for starting an intelligent network. Therefore, it detects the points DP (Detection Points) in the call and connection process in which the IN service logic entities can interact with the basic call and connection management functions. An example of the Call State Model is disclosed with respect to both terminating and originating events in recommendation CS-1, section Q.1214.

FIG. 3 discloses a Call State Model of the calling party in accordance with recommendation Q.1214. The parts describing the model are Points in call PIC, Detection Points DP, transitions and events. The PICs identify the CCF functions which are required for terminating one or several basic call/connection states. The DPs detect the points in the call or connection process in which the control can be transferred to the intelligent network. The transitions detect the normal flow of the call/connection process from one PIC to another. The events cause transitions into the PIC and out of the PIC.

A full description of the State Model O-BCSM will not be disclosed here, but with regard to a detailed specification, a reference is made to CS-1recommendation Q.1214. Some functions will, however, be examined: the entering event of PIC 1 (O_Null&Authorize Origination Attempt) is a disconnection of a previous connection or an indication of the desire of the calling party to transmit a call and the function is to set the connection to an idle state, or the authorization of the calling party to transmit a call with the given features is checked. Start information is collected at PIC 3 from the calling party, the information includes e.g. service codes and the called numbers. The routing of the call and initialization functions are performed at PIC 4. PIC 5 is O_Active and the connection between the calling and receiving party is established there and charging information is collected. Exit functions include an exit function DP9 "disconnection", a service request DP8 "O_Mid_Call" and a handling PIC6 "O_Exception" provided for exceptional situations.

The information flow between the Service Switching Function SSF and the Service Control Function comprises either a request-response pair or merely a request. As regards the messages of information flow, a reference is made to CS-1 recommendation Q.1214. One important message is called "EventReportBCSM" with which the SSF informs the SCF of an event-connected to the call, such as messages busy or no answer. The SCF has earlier requested information about the event with a message "RequestReportBCS-MEvent" which activates the collection of the requested information in the SSF. The intelligent network can provide a large number of different services, such as 800 numbers, i.e. free-call numbers; 700 numbers, i.e. chargeable teleservices; pocket number; Automatic Alternative Billing (collect call) and Credit Card Calling. Credit Card Calling CCC is charged with one's own credit card. The caller is authenticated by means of a credit card number and a password. In a service ACC (Account Card Calling) called pocket number the user has a code and a password by means of which the user can call from a pay phone without coins. The Automatic Alternative Billing (AAB) allows the user to call from any phone, whereby the call is charged from the user's account. The charging of the call is not dependent on the line the call is made from, nor on the line the call is made to. The provider of the service allocates an Account Code and a Personal Identification Number PIN to the user of the service.

In card calls the service process is activated when the user selects the access code which is an access number defined by the teleoperator. The telenetwork directs the call to the SSP that analyzes the number. The State Model of FIG. 3 is in DP3 in which the SSP sends an inquiry to the SCP with a message InitialDP. The SCP responses with a message "Prompt&CollectUserInfo" to which as a response A subscriber is requested to give the card number, password and the number of B subscriber. The SSP gives the information to the SCP. It notifies the charging information to the SSP, when needed, with a message "Furnish Charging Information" in order to create a charging record. The SCP further sends a message "RequestReportBCSMEvent" to which as a response DP9 "O_Disconnect" monitors the release of the call and when it occurs, sends a message to the SCP and a message "Connect" to which as a response a connection is established to B subscriber. When a speech connection is broken off as B subscriber hangs up, DP9 detects it and sends a message "EventReportBCSM" to the SCP.

When in the above-mentioned cases B subscriber of the first call breaks off the call, DP9 detects it and gives a message to the SCP. After this, the connection would be-disconnected. However, if A subscriber wants to make a continuing call, that is, call more than one number during the same call at the intelligent network service, ITU-T (former CCITT) and ETSI recommendations render it possible to accomplish this service so that despite the break off of B subscriber, A subscriber can select a new B subscriber number without dialling the service number, account code and the PIN number again.

There are, however, some problems in the current recommendations. FIG. 4 discloses a method in compliance with Belcore AIN recommendation. When B subscriber has hung up, the Service Switching Point SSP sends information to the Service Control Point about hanging up in a message "CLEARED". As a response to the message, the SCP sends a request about disconnecting the B leg in a message "DISC(TER_LEG). The Call Control Function CCF of the exchange disconnects the B leg and the SSP notifies of it to the SCP in a message "CLEARED(1)" and the SCP acknowledges it in a response message "SEND_TO_RESTORE". After this, the selection of A subscriber can be received. As can be seen in the figure, this method requires an exchange of several messages between the SSP and the SCP. A disadvantage is. that it loads the signalling network.

FIG. 5 discloses a method in compliance with ETSI recommendation. It requires that after B subscriber has hung up, a timer is started which is released after a set time, about 1 to 2 min, after which the B leg is disconnected. Information on the disconnection is given in an "EventReport-BCSM" message to the Service Control Point SCP that after this gives a message "Prompt&CollectUserInformation". This produces a transition in the State Model to the call point PIC 3 "Collect_Info". A disadvantage of this method is that after B subscriber is broken off, there is a waiting time of about one minute before B subscriber is disconnected. This waiting is annoying to A subscriber, especially when there are many calls to be made.

The solutions of both known methods can naturally function so that A subscriber breaks off the call completely and selects again the access, PIN and B subscriber number.

SUMMARY OF THE INVENTION

The objective of this invention is such a method for switching off B subscriber and disconnecting the b line that does not have the disadvantages of the known methods described above.

This set objective is achieved with a method disclosed in claim 1.

As soon as A subscriber exchange receives a message about the hanging up of B subscriber, the SSP notifies the SCP of this. The SCP gives at once a prompt to disconnect the B leg and start receiving the selection of A subscriber.

BRIEF DESCRIPTION OF THE DRAWINGS

In the following, the invention will be described in greater detail with reference to the attached figures, in which.

DETAILED DESCRIPTION OF THE PRESENTLY PREFERRED EXEMPLARY EMBODIMENT

Figure 6:
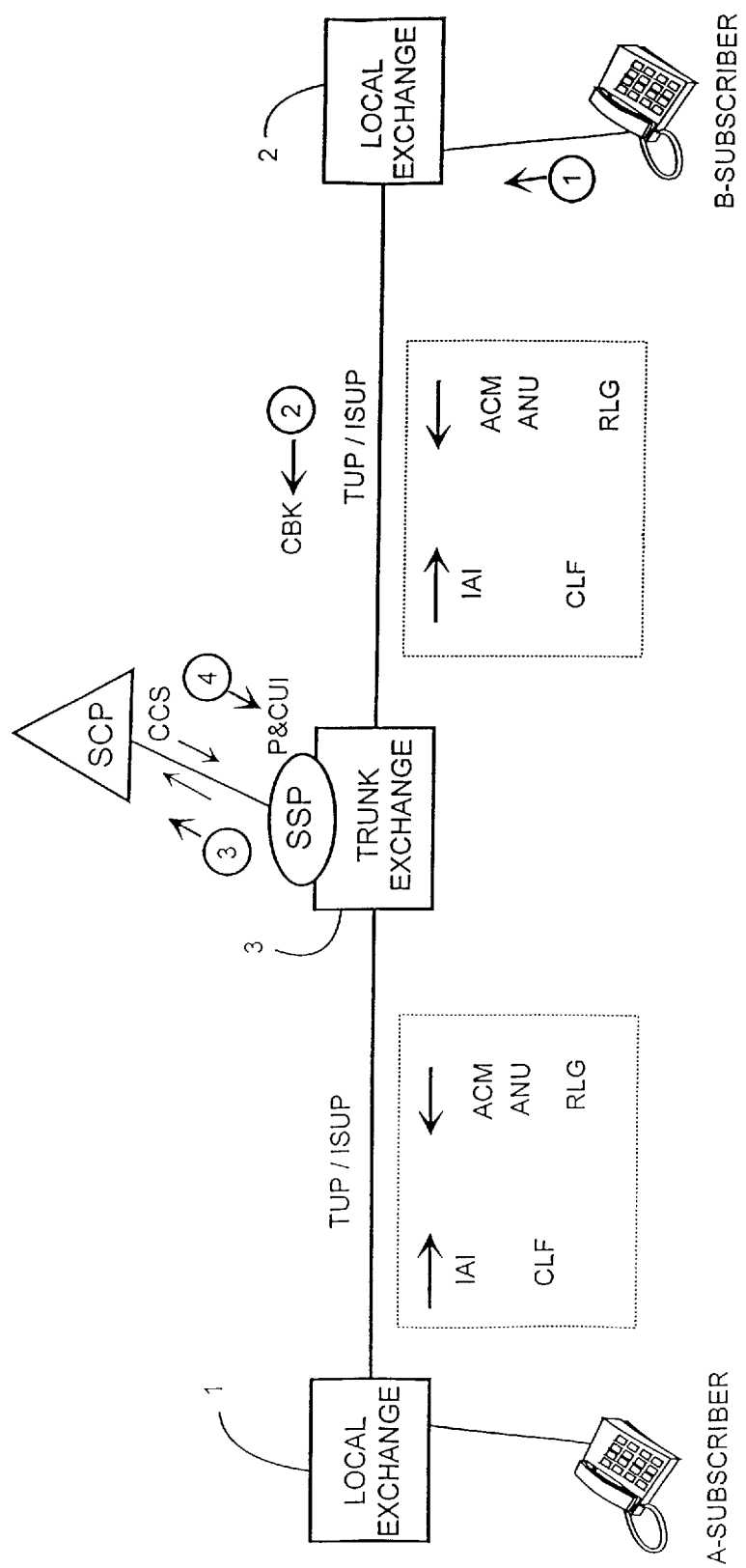
FIG. 6 is an example of the telephone network and FIG. 7 an exchange of messages in the method of the invention.

In the example of the network according to FIG. 6, A subscriber is connected to a local exchange 1 and B subscriber to a local exchange 2. Both exchanges are connected by a junction line to a trunk exchange 3 to which the Service Switching Point SSP of the intelligent network is connected. The Service Control Point SCP of the intelligent network can be accessed from the telephone network via the SSP. Messages are exchanged between the exchanges in accordance with the used signalling system, e.g., TUP or SUP. This example employs TUP signalling. The messages between the Service Control Point SCP and the Service Switching Point of the intelligent network are in compliance with ETSI CoreINAP Specification.

In a card call A subscriber first dials an access code that is a number given by the teleoperator. The exchange 1 sends a start message IAI containing the dialled number to the trunk exchange 3. In the trunk exchange the telenetwork directs the call to the SSP that analyzes the number. The function is in point DP3 in the Call State Model BCSM. The SSP has already handled the functions relating to DP1 and DP2. A speech connection is established between the trunk exchange 3 and the local exchange 1. In DP3 the SSP sends to the SCP a message Initial DP to which as a response the SCP sends to the SSP a message P&CUI (Prompt&Collect-UserInformation). This causes the Intelligent Peripheral IP connected to the SSP to send to A subscriber an audio response in which the card number, password and B subscriber number are requested. A subscriber submits these numbers and the SSP forwards them in a P&C-result message to the SCP. The Service Control Point SCP responses, when needed, with a message FCI (Furnish Charging Information) with which it gives charging information to the SSP so that the SSP can create a charging record of the call. The SCP always sends a message RequestReportBCS-MEvent with which it requests the SSP to notify of the event causing the impulse and sets the point O_Answer of the State Model as the Detection Point DP. After this the SCP still sends a message Connect with which a connection to B subscriber is requested to be established. The trunk exchange 3 sends the usual IAI message to the local exchange 2 and receives as a response an Address Complete Message ACM.

When B subscriber has picked up the receiver, the exchange 2 sends a response message ANU (Answer signal, unqualified) which is transmitted to the exchange 1. The SSP detects in the detection point O_Answer of the Call State Model set by the SCP that B subscriber has responded, whereby it sends information on it to the SCP in a message EventReportBCSM. After this, a speech connection is connected between the subscribers.

When the conversation is terminated, A subscriber does not hang up but B subscriber does, which event is shown in FIG. 6 by a circled numeral 1. Information on the hanging up is received from the exchange 2 of B subscriber to the trunk exchange 3. in a message CBK (Clear Backwards) which event is shown by a circled numeral 2. The SSP connected to the trunk exchange immediately sends information about the event to the SCP in a message EventReportBSCM, event 3. The SCP responds with a message Prompt&CollectUser-Information, event 4, to which as a response the SSP orders the telenetwork to disconnect the B subscriber leg and it is after this ready to receive the selection of the new B subscriber number by A subscriber. Messages CLF (ClearForward) and RLG (ReleaseGuard) are used for disconnecting the B subscriber leg.

Figure 1:
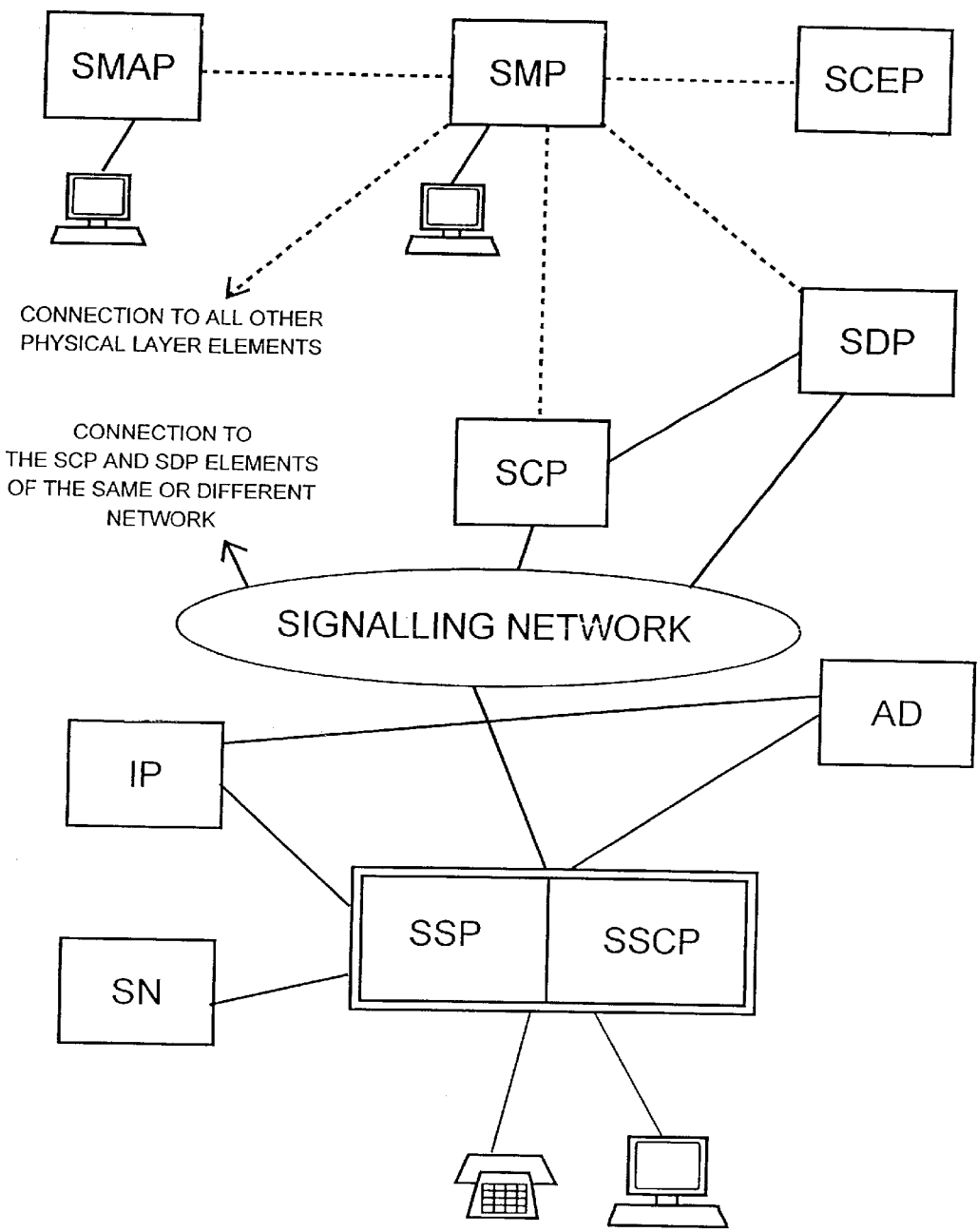
FIG. 1 shows physical architecture of an intelligent network.
Figure 2:
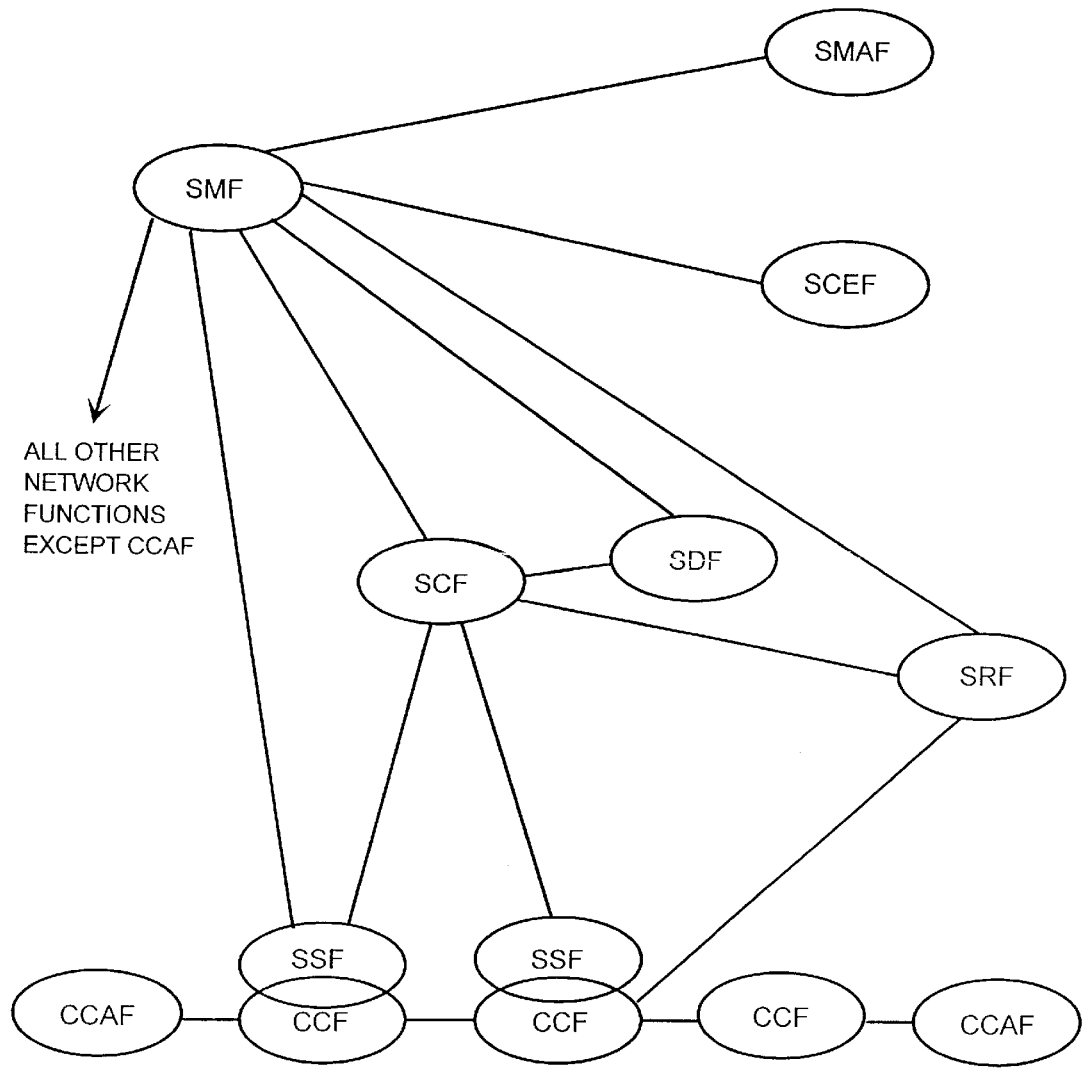
FIG. 2 illustrates the intelligent network as operational wholes.
Figure 3:
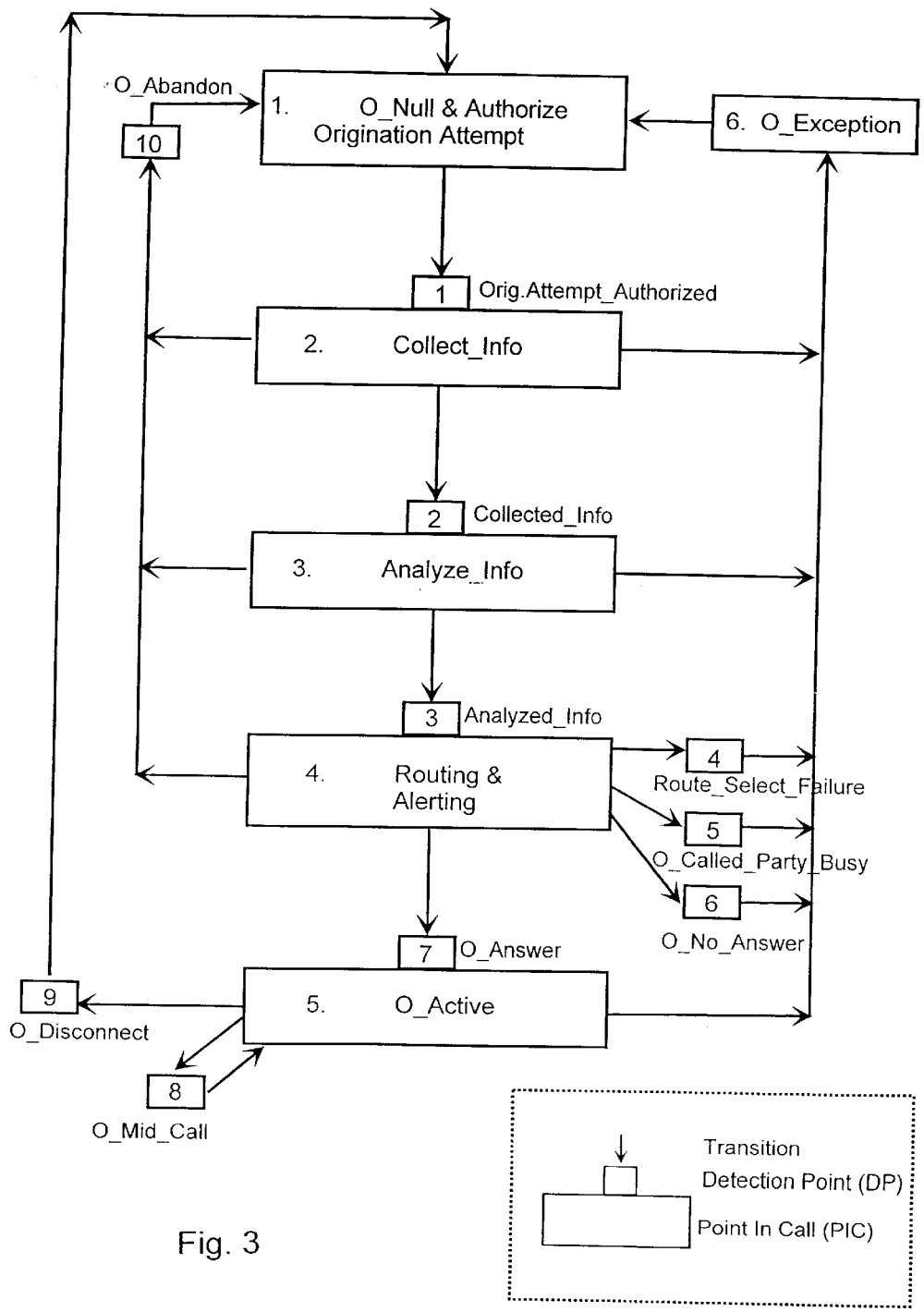
FIG. 3 illustrates the Call State Model BCSM, FIG. 4 a known method for releasing a call, FIG. 5 another known method for releasing a call.
Figure 4:
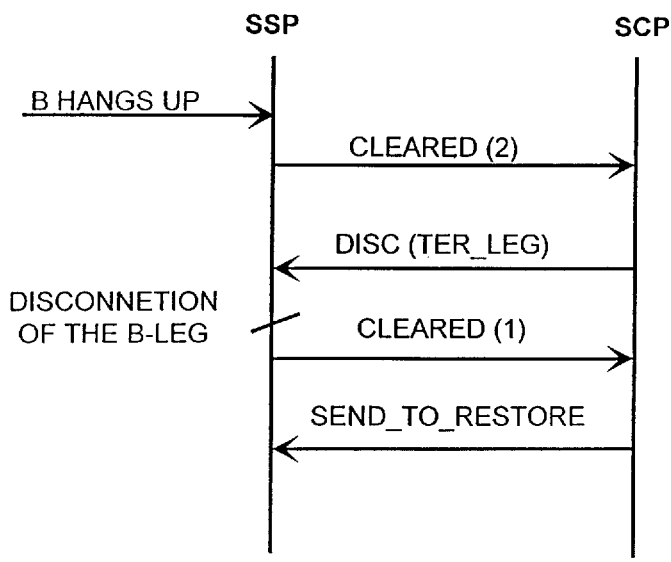
Figure 5:
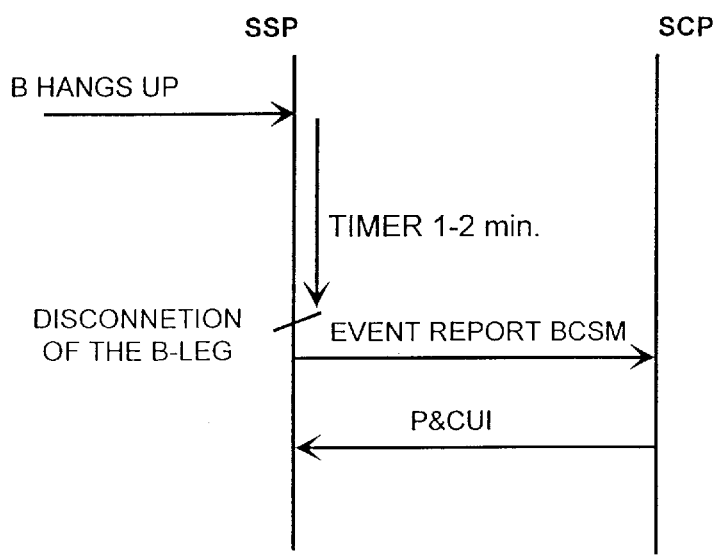
Figure 7:
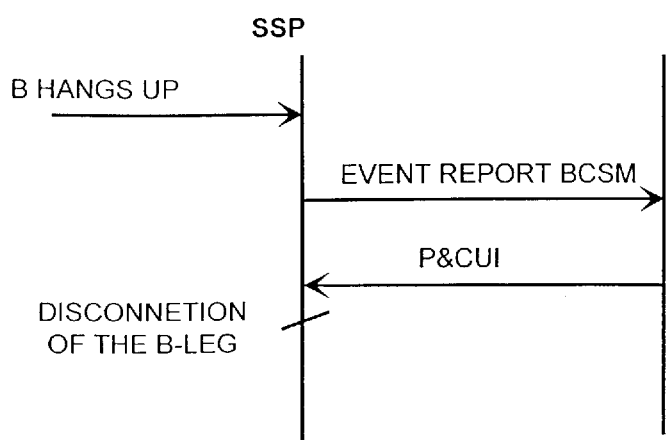

FIG. 7 illustrates the message exchange between the SSP and the SCP in a method according to the invention. When comparing the invention to the prior art method of FIG. 5, it is found out that there is no waiting time set by a timer and when comparing to the prior art method of FIG. 4, it is found out that there are two messages less of the signalling that loads the intelligent network.

It is to be understood that the explanation above and the figures relating thereto are only meant to illustrate the present invention. The different variations and modifications of the invention will be obvious to those skilled in the art without deviating from the scope and spirit of the invention disclosed in the appended claims.

What is claimed is:

1. A method for making a continuing call in a telephone network wherein a call is established between subscribers by using an intelligent network in which a Service Switching Function included therein identifies the service and activates with a Service Control Function a cooperation which involves message exchange between functions, wherein when a first subscriber has broken off a call, the Service Switching Function sends a message to the Service Control Function containing information on the break off of the call, as a response to said message, the Service Control Function sends a message to the Service Switching Function containing a request to collect the dialing by a calling subscriber relating to a new subscriber, as a response to said request, the Service Switching Function directs the telephone network to disconnect the connection to the first subscriber and create a connection to the new subscriber.

2. A method according to claim 1, wherein the call is a card calling provided as an intelligent network service at the beginning of which call the right of the calling subscriber to make the call is checked.

* * * * *